(12) United States Patent
Dhawan

(10) Patent No.: US 9,595,859 B2
(45) Date of Patent: Mar. 14, 2017

(54) MULTI-PHASE MULTI-POLE ELECTRIC MACHINE

(76) Inventor: Rakesh K. Dhawan, Ashbrun, VA (US)

( * ) Notice: Subject to any disclaimer, the term of this patent is extended or adjusted under 35 U.S.C. 154(b) by 98 days.

(21) Appl. No.: 13/433,316

(22) Filed: Mar. 29, 2012

(65) Prior Publication Data

US 2013/0257327 A1    Oct. 3, 2013

(51) Int. Cl.
| | | |
|---|---|---|
| *H02K 1/00* | (2006.01) | |
| *H02K 21/22* | (2006.01) | |
| *H02K 7/14* | (2006.01) | |
| *H02P 25/22* | (2006.01) | |
| *B60L 3/00* | (2006.01) | |
| *B60L 11/00* | (2006.01) | |
| *B60L 11/14* | (2006.01) | |
| *B60L 11/18* | (2006.01) | |
| *B60L 15/20* | (2006.01) | |
| *A61G 5/04* | (2013.01) | |
| *A61G 5/10* | (2006.01) | |

(52) U.S. Cl.
CPC .......... *H02K 21/22* (2013.01); *B60L 3/0061* (2013.01); *B60L 11/007* (2013.01); *B60L 11/14* (2013.01); *B60L 11/1803* (2013.01); *B60L 15/2036* (2013.01); *B60L 15/2054* (2013.01); *H02K 7/14* (2013.01); *H02K 11/24* (2016.01); *H02K 11/33* (2016.01); *H02P 25/22* (2013.01); *A61G 5/04* (2013.01); *A61G 2005/1054* (2013.01); *B60L 2200/12* (2013.01); *B60L 2200/34* (2013.01); *B60L 2210/40* (2013.01); *B60L 2220/14* (2013.01); *B60L 2220/44* (2013.01); *B60L 2220/58* (2013.01); *B60L 2240/12* (2013.01); *B60L 2240/36* (2013.01); *B60L 2240/421* (2013.01); *B60L 2240/423* (2013.01); *B60L 2250/16* (2013.01); *B60L 2250/24* (2013.01); *B60L 2250/26* (2013.01)

(58) Field of Classification Search
CPC .. H02K 7/1846; H02K 21/24; B60L 2220/44; B60L 2220/46; B60L 2200/12; B60L 2200/34
USPC .......... 310/179–210, 75 C, 67 A; 180/65.51
See application file for complete search history.

(56) References Cited

U.S. PATENT DOCUMENTS

| | | | | |
|---|---|---|---|---|
| 5,780,980 A | * | 7/1998 | Naito ....................... | B60K 6/28 307/19 |
| 5,994,812 A | * | 11/1999 | Muszynski .............. | H02K 3/28 310/179 |
| 6,737,786 B2 | * | 5/2004 | Hsu ........................... | 310/254.1 |

(Continued)

OTHER PUBLICATIONS

B. Aslan, Slot/Pole Combinations Choice for Concentrated Multiphase Machines dedicated to Mild-Hybrid Applications, 2011, IEEE International Conference on Industrial Applications of Electronics, Australia, DOI: 10.1109/IECON.2011.6119910, pp. 1-6.*

*Primary Examiner* — Eduardo Colon Santana
*Assistant Examiner* — Bickey Dhakal

(57) ABSTRACT

A multi-phase multi-pole electric machine attached to a vehicle. The multi-phase multi-pole electric machine includes rotor, stator with five phase windings, machine controller, and torque sensors. The machine controller controls the flow of current. The torque sensors senses the torque exerted by the vehicle and transmits the information to the machine controller. The machine controller provides four degree of control through injection of five phase currents and thus providing higher torque.

11 Claims, 28 Drawing Sheets

(56) References Cited

U.S. PATENT DOCUMENTS

| | | | |
|---|---|---|---|
| 6,791,226 B1* | 9/2004 | Dhawan | 310/184 |
| 7,375,450 B2* | 5/2008 | Tanaka | B62J 6/12 310/216.004 |
| 7,690,457 B2* | 4/2010 | Nakanowatari | 180/65.265 |
| 2003/0047369 A1* | 3/2003 | Katagiri | B60L 11/1801 180/206.2 |
| 2003/0213630 A1* | 11/2003 | Pyntikov | B62M 6/40 180/220 |
| 2004/0000454 A1* | 1/2004 | Chang et al. | 188/71.5 |
| 2004/0200057 A1* | 10/2004 | Maslov | B60L 8/00 29/596 |
| 2009/0266640 A1* | 10/2009 | Oshima et al. | 180/444 |
| 2010/0089671 A1* | 4/2010 | Trunkenpolz | 180/65.23 |
| 2011/0259658 A1* | 10/2011 | Huang | B60K 1/04 180/65.51 |
| 2012/0190491 A1* | 7/2012 | Gunji et al. | 475/5 |
| 2012/0302390 A1* | 11/2012 | Lemire-Elmore et al. | 475/149 |

\* cited by examiner

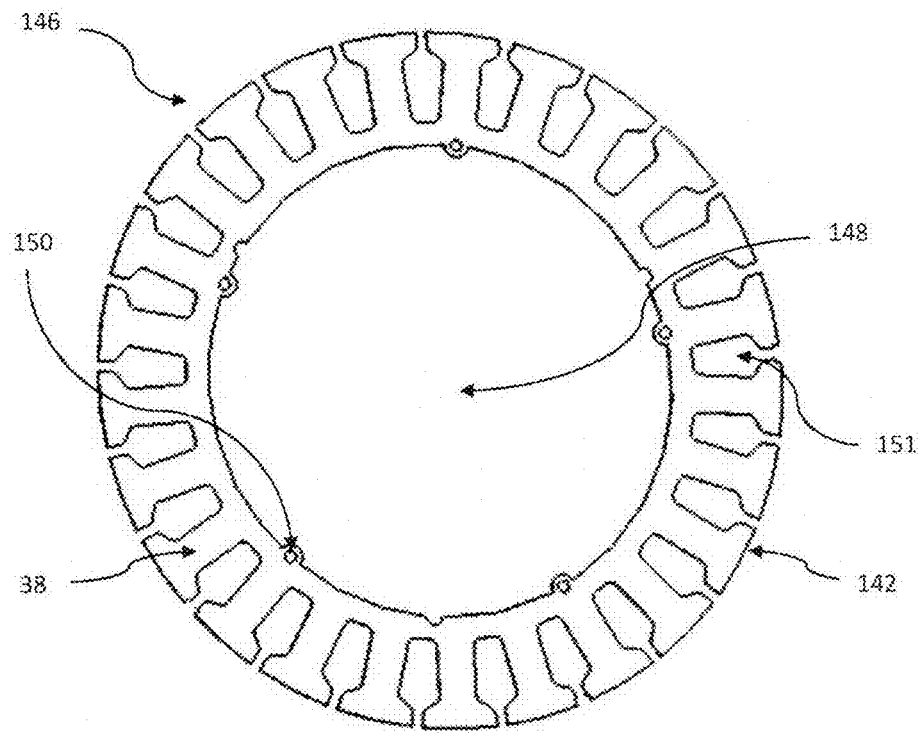
Figure 17: Exemplary Stator Laminate
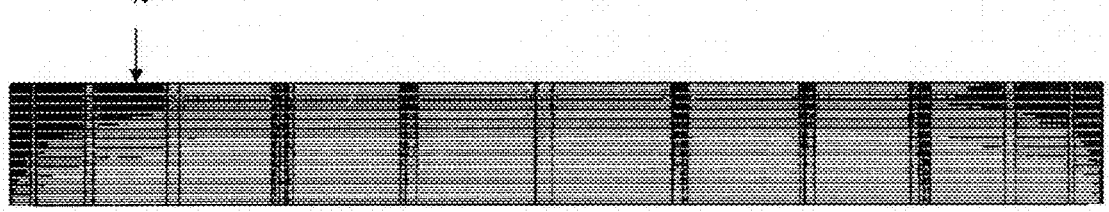
Figure 18: Exemplary Lamination Stack

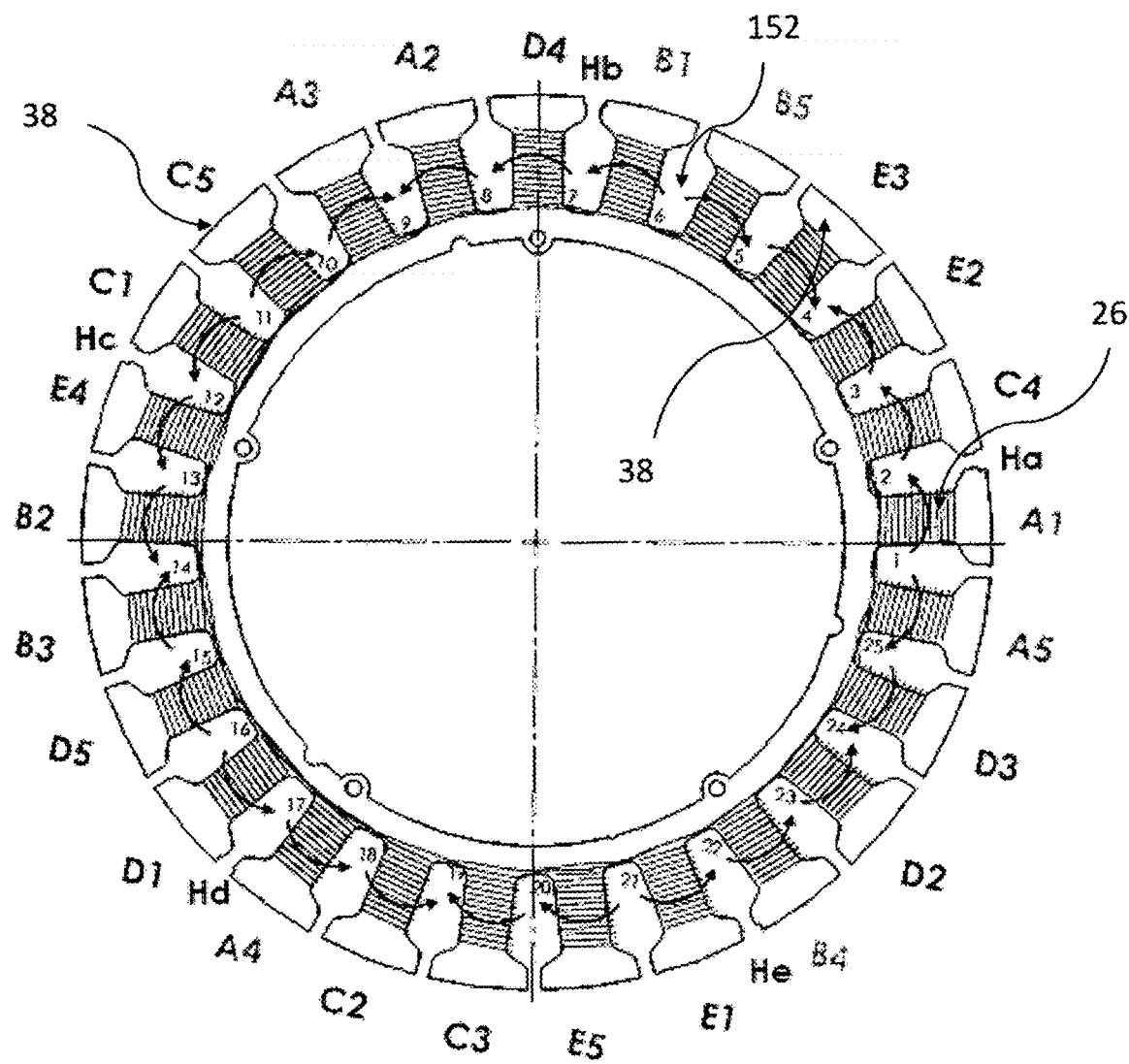
Figure 19: Exemplary Winding Details

| WINDING DETAILS ||||||
|---|---|---|---|---|---|
| SR NO | PHASE A | PHASE B | PHASE C | PHASE D | PHASE E |
| 1 | A1(1,2) | B1(6,7) | C1(11,12) | D1(16,17) | E1(21,22) |
| 2 | A2(8,9) | B2(13,14) | C2(18,19) | D2(23,24) | E2(3,4) |
| 3 | A3(10,9) | B3(15,14) | C3(20,19) | D3(25,24) | E3(5,4) |
| 4 | A4(17,18) | B4(22,23) | C4(2,3) | D4(7,8) | E4(12,13) |
| 5 | A5(1,25) | B5(6,5) | C5(11,10) | D5(16,15) | E5(21,20) |

FIGURE 21

Figure 22: Exemplary Stator winding with rotor position sensors

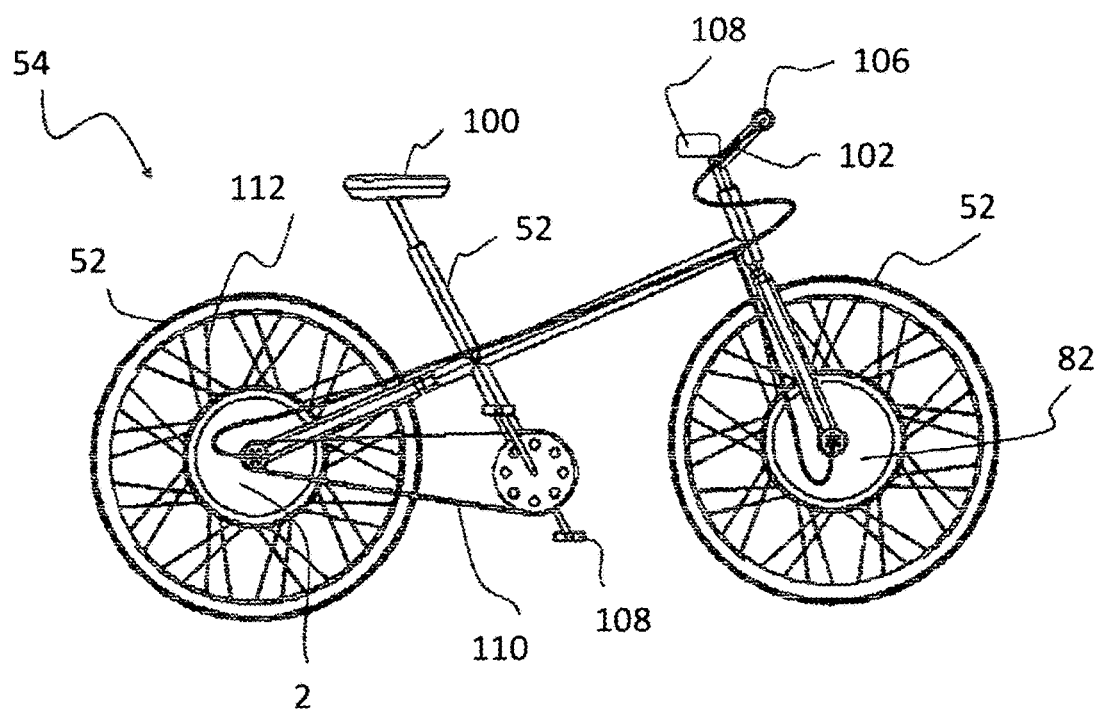
Figure 29: Exemplary use of the invention
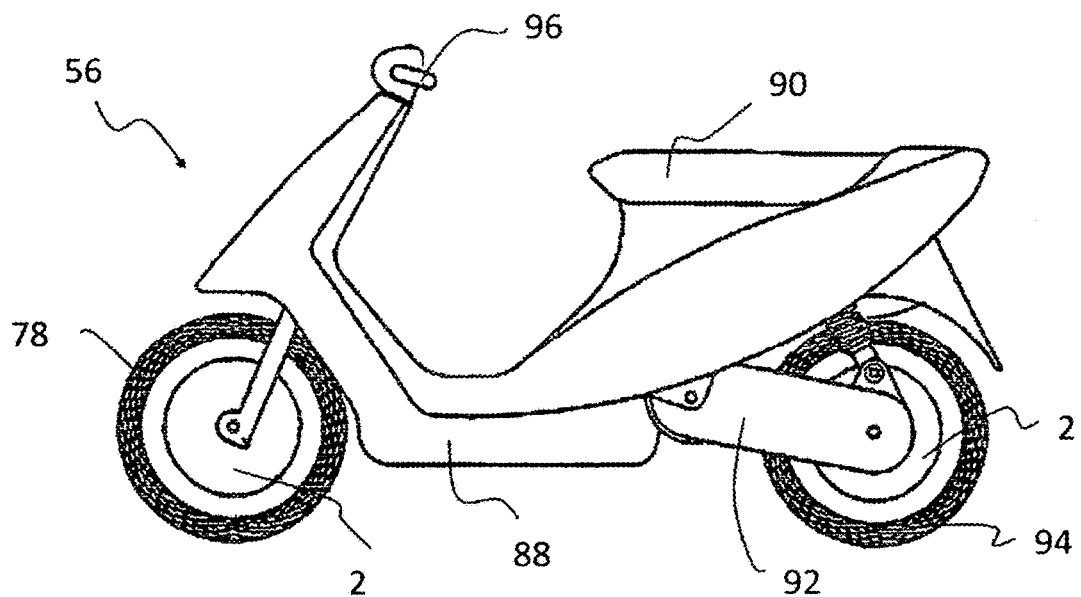
Figure 30: Exemplary use of the invention

MULTI-PHASE MULTI-POLE ELECTRIC MACHINE

BACKGROUND OF THE INVENTION

Field of Invention

The present invention generally relates to electric machines, and more specifically relates to a portable electrical machine having five phase windings with enhanced torque.

Description of the Prior Art

The conventional electric machines work either as motors or generators, while some machines work both as motor and generators. Conventional electric machines typically include a moveable portion, often referred to as a rotor, and a stationary portion, often referred to as a stator. Two conventional rotor designs include a conductive wire cage rotor, such as, for example a rotor for an AC induction motor and a plurality of permanent magnets formed into a rotor, and another conventional rotor is a brushless AC synchronous permanent magnet motor. A conventional stator includes plurality of poles, phases and windings around the poles.

The conventional electric machines generally have a disadvantage due to limited portability. The conventional designs of the electric machine certainly provide low torque and power levels of those electric machines restrict their application in difficult terrains such as hills, and low top speed. The conventional electric machine is operated by a machine controller. Conventional controllers are designed and operated by using electronic hardware, digital signal processors (computers), and software have allowed electric machines to operate more efficiently.

Therefore, there is a need of an electric machine implementing a five phase winding arrangement for enhanced torque. Further, need for an electric machine with an improved machine design and machine configurations. Furthermore, an electric machine with a machine controller that provides four degrees of control through injection of five phase currents.

SUMMARY OF THE INVENTION

In accordance with the teachings of this invention, an electric machine is provided with an improved structure and high torque.

An object of the present invention is to provide an electric machine with a five-phase motor, machine controller and torque sensor.

Another object of the present invention is to provide an electric machine with a gear and brake adaptor.

Another object of the present invention is to provide an electric machine with a machine controller to control the flow of current.

Another object of the present invention is to provide an electric machine with a rotor, stator, and machine controller all located in the same housing with a central aperture.

Another object of the present invention is to provide an electric machine with plurality of poles and magnets.

BRIEF DESCRIPTION OF DRAWINGS

FIG. 17 illustrates a perspective view of plurality of stator poles in accordance with a preferred embodiment of the present invention.

FIG. 18 illustrates a side view of plurality of stator poles in accordance with a preferred embodiment of the present invention.

FIG. 19 illustrates an arrangement of five phase winding in accordance with a preferred embodiment of the present invention.

FIG. 21 illustrates an arrangement of five phase winding in a tabular form in accordance with a preferred embodiment of the present invention.

FIG. 29 illustrates a perspective view of a bicycle in accordance with a preferred embodiment of the present invention.

FIG. 30 illustrates a perspective view of a scooter in accordance with a preferred embodiment of the present invention.

DESCRIPTION OF THE PRESENT INVENTION

Figure 1:
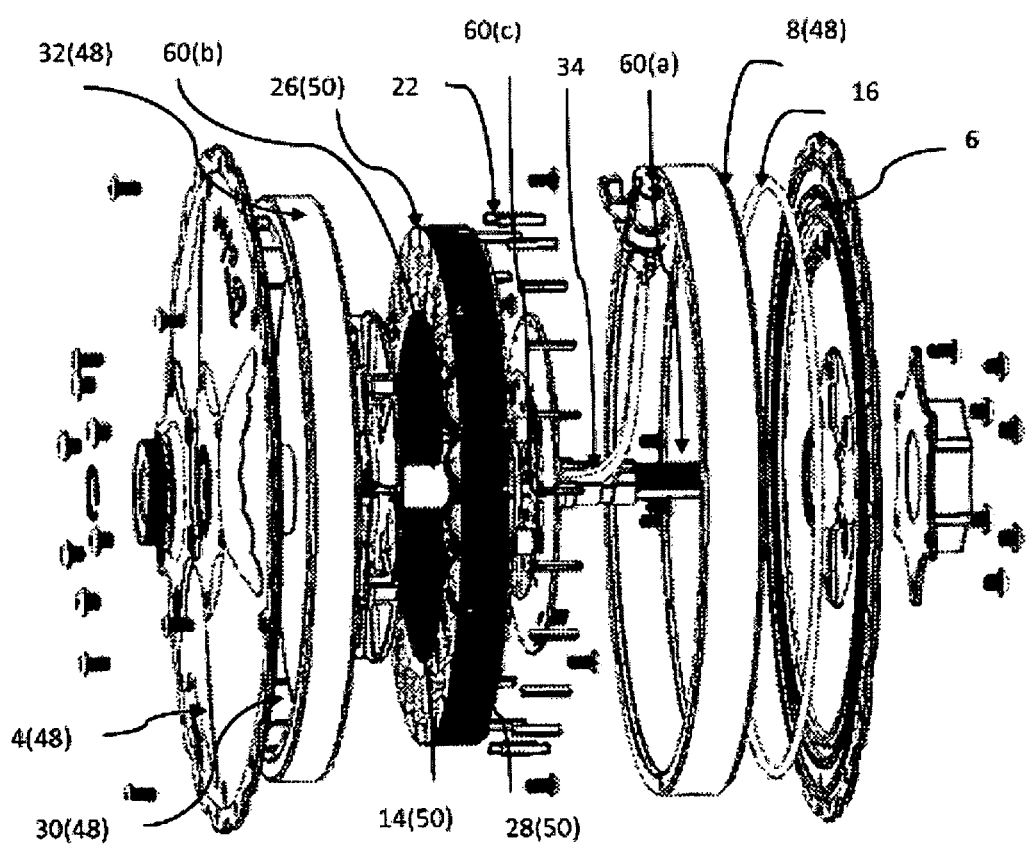
FIG. 1 illustrates an exploded view of the electric machine in accordance with a preferred embodiment of the present invention.
Figure 2:
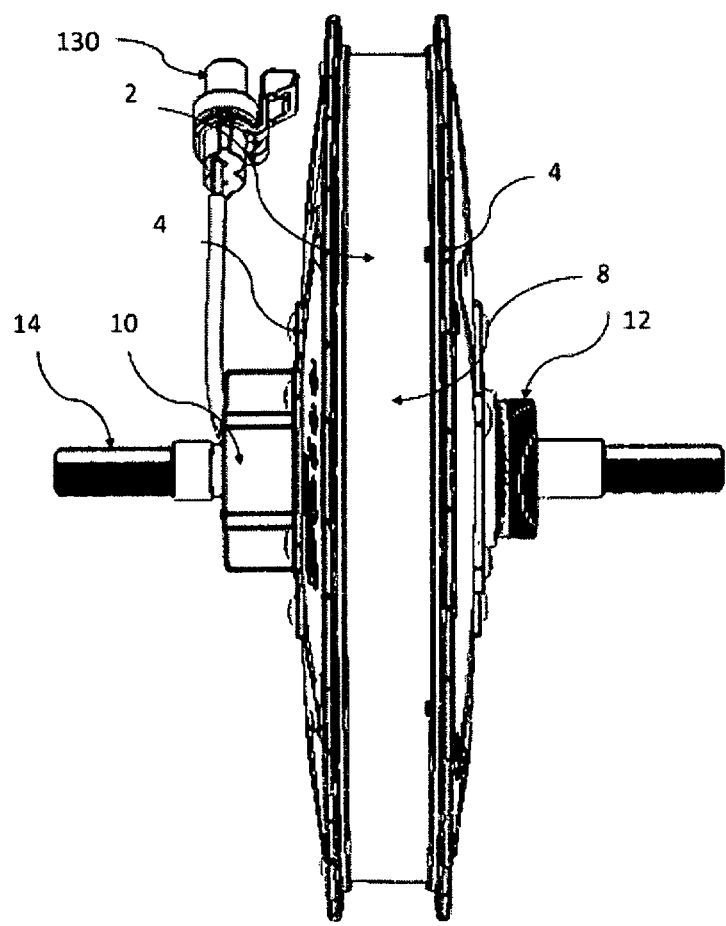
FIG. 2 illustrates a perspective view of an electric machine in accordance with a preferred embodiment of the present invention.

FIG. 1 and FIG. 2 illustrate an exploded view and perspective view of an electric machine 2, in accordance with preferred embodiment of the present invention. The electric machine 2 attached to a vehicle (not shown in FIG. 1 and FIG. 2). In a preferred embodiment of the present invention, the electric machine 2 includes a rotor 48, a stator 50, a machine controller 20 and plurality of torque sensors 34. The rotor 48 includes a connecting pipe 8 (not shown in FIG. 1 and FIG. 2), a back-iron 32, plurality of rotor poles 30 and one or more covers 4. The stator 50 is mounted upon the rotor 48. The rotor 48 is explained in detail in conjunction with FIG. 3 of the present invention. The stator 50 includes a stator plate 28, an axle 14 and a five phase winding 26. As shown in FIG. 1, the axle 14 passes through the centre aperture 60 of electric machine 2. The centre aperture 60 hereinafter denoted as rotor centre aperture 60a, stator centre aperture 60b and machine controller centre aperture 60c.

Figure 11:
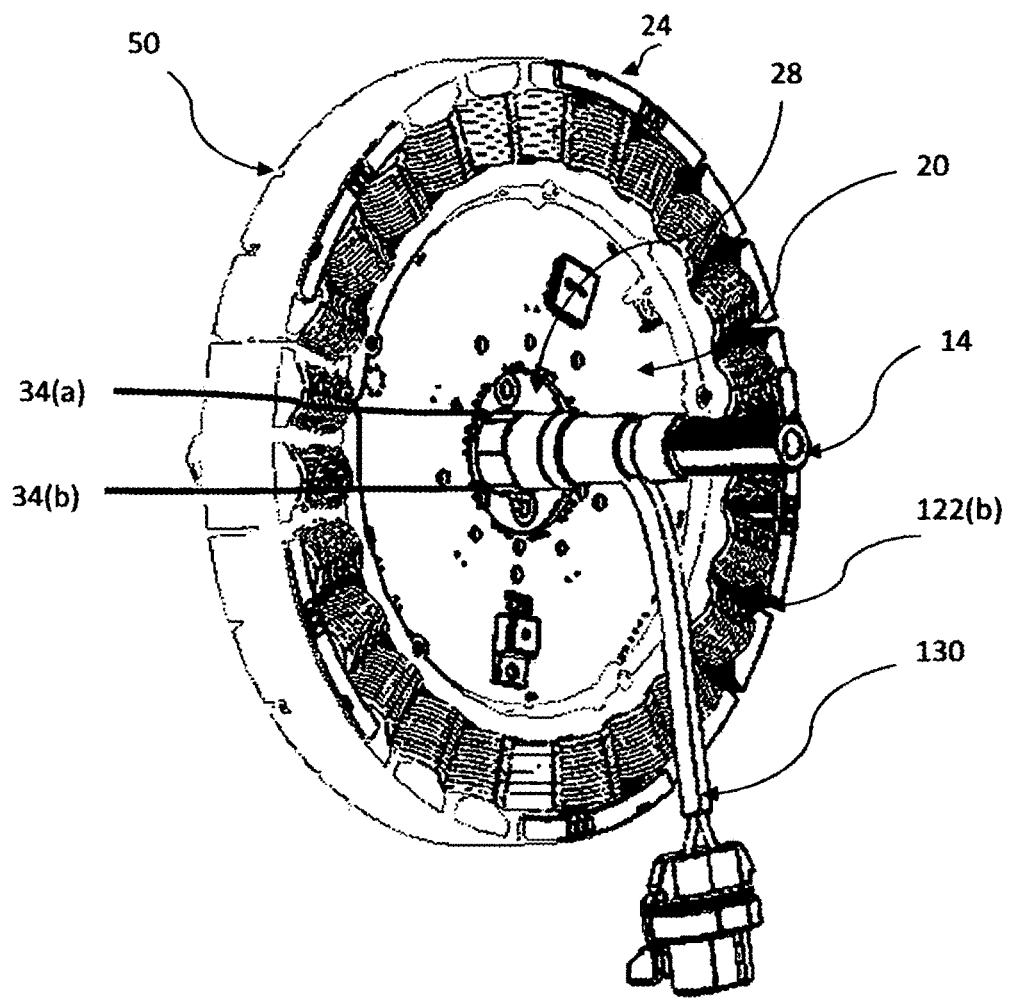
FIG. 11 illustrates a perspective view of stator in accordance with a preferred embodiment of the present invention.

The stator 50 is explained in detail in conjunction with FIG. 11 of the present invention. The machine controller 20 is attached to the stator 50 and the machine controller 20 controls the flow of current towards the stator 50. The machine controller 20 is explained in detail in conjunction with FIG. 13, FIG. 14 and FIG. 15 of the present invention. The plurality of torque sensors 34 are attached to the axle 14. The plurality of torque sensors 34 sense the torque exerted and transmits this information to the machine controller 20. The plurality of torque sensors 34 are explained in detail in conjunction with FIG. 12 and FIG. 13 of the present invention. In another embodiment of the present invention as shown in FIG. 2, the electric machine 2 further comprises a brake adaptor 10 and a gear adaptor 12.

Figure 3:
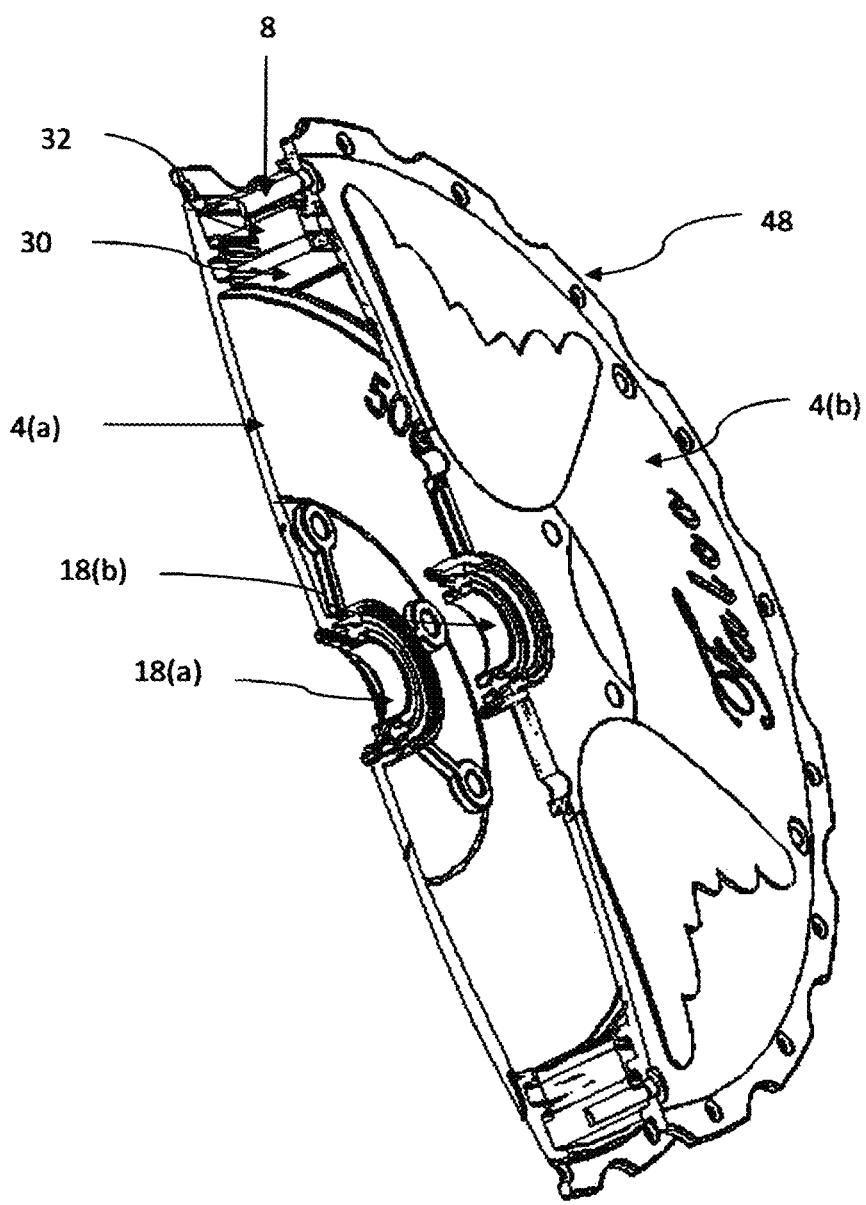
FIG. 3 illustrates a perspective view of the rotor in accordance with a preferred embodiment of the present invention.

FIG. 3 illustrates a perspective view of the rotor 48, in a preferred embodiment of the present invention. The rotor 48 includes a connecting pipe 8, plurality of rotor magnets 30 and one or more covers 4. The one or more covers 4 such as cover 4a and cover 4b is attached to the wheel of the vehicle. The one or more covers 4 are explained in detail in conjunction with FIG. 5 of the present invention. In a preferred embodiment of the present invention the electric machine 2 further includes one or more bearings 18 such as bearing 18a and bearing 18b to support the one or more covers 4. The one or more bearings 18 further provide sealing against water and dust to other elements of the electric machine 2. The one or more bearings 18 connected to a bearing retention area 68 (not shown in FIG. 3) on the one or more covers 4. The connecting pipe 8 is disposed between one or more cover 4 and provides support to one or more covers 4. The connecting pipe 8 is explained in detail in conjunction with FIG. 6 of the present invention. In a preferred embodiment rotor 48 further includes a back iron 32 to provide support to plurality of rotor magnets 30. The back iron 32 and plurality of rotor magnets 30 are explained in detail in conjunction with FIG. 7 and FIG. 8 respectively, of the present invention.

Figure 4:
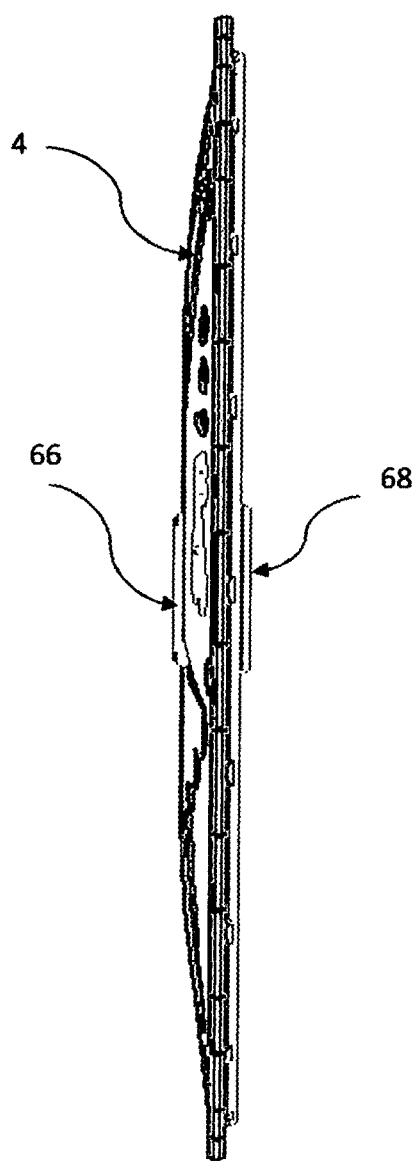
FIG. 4 illustrates a side view of a cover in accordance with a preferred embodiment of the present invention.
Figure 5:
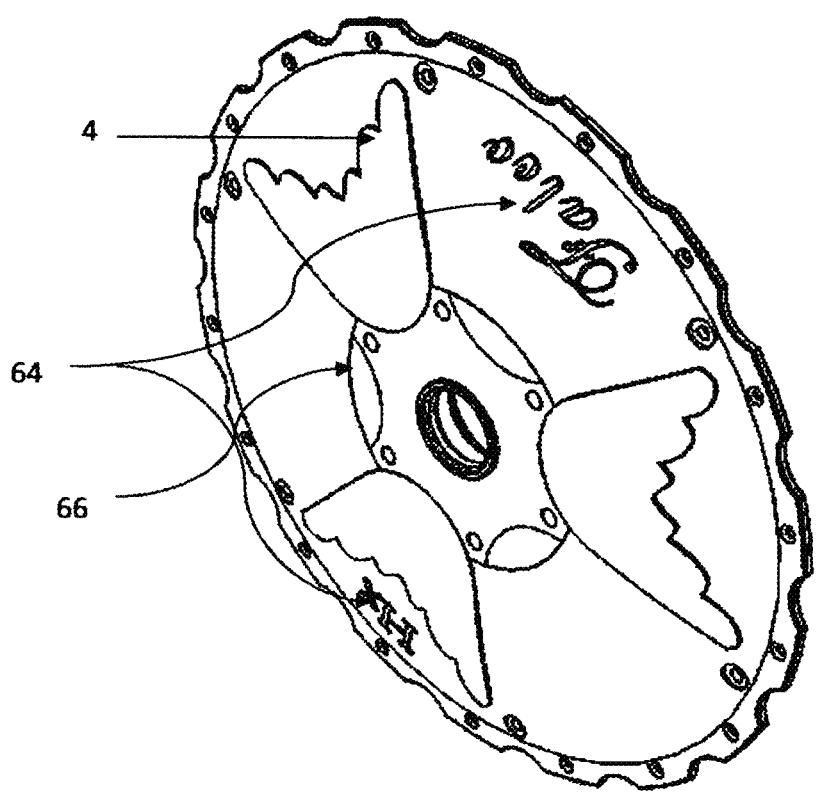
FIG. 5 illustrates a perspective view of a cover in accordance with a preferred embodiment of the present invention.

FIG. 4 and FIG. 5 illustrate a side view and perspective view respectively, of a cover 4 in a preferred embodiment of the present invention. The one or more covers 4 may be designed to provide cooling to various elements of the electric machine 2. As shown in FIG. 5, the one or more covers 4 include strength and aesthetic element 64 and a cover surface 66 Examples of strength and aesthetic element 64 include but not limited to falco, Hk and any other geometrical shape elements. The covers 4 further provide additional mechanical strength to the electric machine 2. The one or more covers 4 may comprise of any hard material including but not limited to metal, plastic, wood etc. The shape of one or more covers 4 includes but not limited to circular, oval, rectangle etc. The diameter of the one or more covers 4 may vary from 4 to 24 inches.

Figure 6:
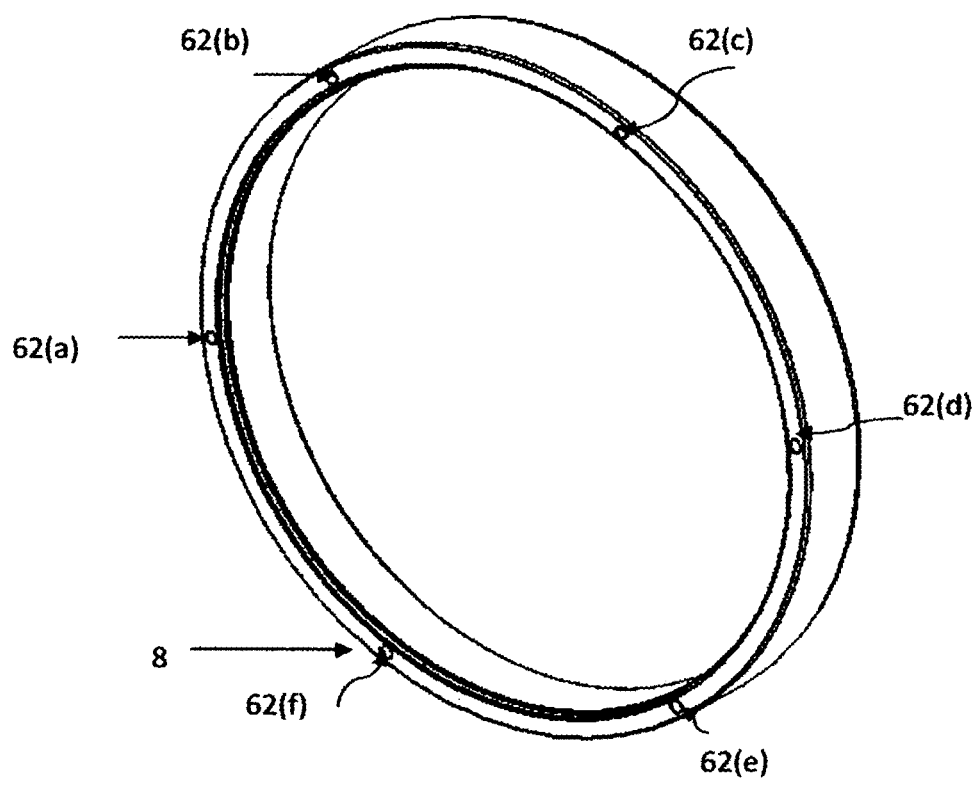
FIG. 6 illustrates a perspective view of a connecting pipe in accordance with a preferred embodiment of the present invention.

FIG. 6 illustrates a perspective view of a connecting pipe 8 in a preferred embodiment of the present invention. The connecting pipe 8 further includes one or more machine mounting elements 62, such as machine mounting element 62a, 62b, 62c, 62d, 62e and 62f. As shown in FIG. 6, the machine mounting element 62 are located at the outer perimeter of the connecting pipe 8. The connecting pipe 8 may be used to provide cooling to the various elements of the electric machine 2. The shape of the connecting pipe 8 includes but not limited to cylindrical, circular, spherical etc. The connecting pipe 8 may comprise of any hard material including but not limited to metal, plastic, wood etc. The diameter of connecting pipe 8 may vary from 4 to 24 inches. In another embodiment of the present invention the surface of the connecting pipe 8 may be made rough or modified with fins to enhance cooling of the various elements of the electric machine 2.

Figure 7:
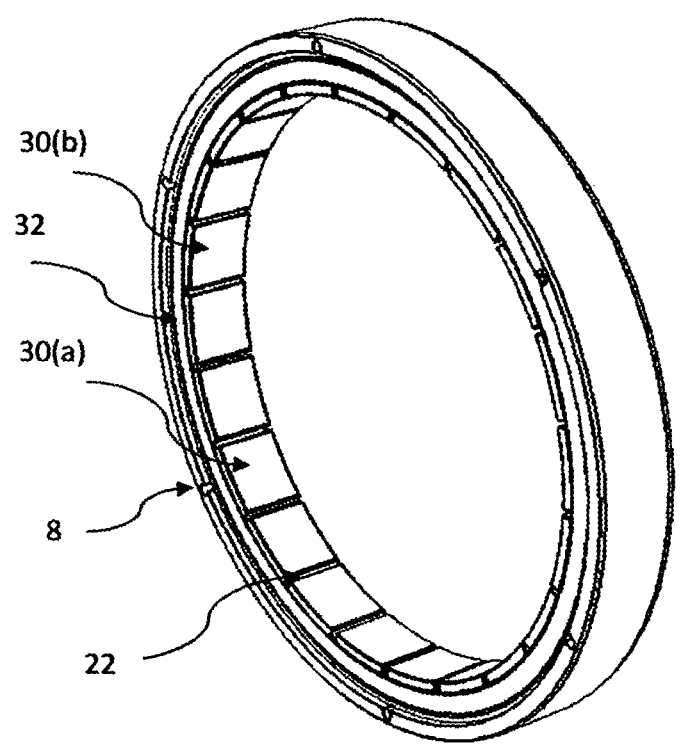
FIG. 7 illustrates a perspective view of the arrangement of plurality of rotor poles in accordance with a preferred embodiment of the present invention.

FIG. 7 illustrates a perspective view of the arrangement of plurality of rotor magnets 30 inside a connecting pipe 8, in a preferred embodiment of the present invention. The plurality of rotor magnets 30 such as rotor magnet 30a, 30b are physically separated by magnet spacer 22. The plurality of rotor magnets 30 are alternatively placed inside the connecting pipe 8. In another embodiment of the present invention, the back iron 32 is placed in between the rotor magnets 30 and the connecting pipe 8. The rotor magnets 30 and back iron 32 are explained in detail in conjunction with FIG. 8 and FIG. 9 respectively.

Figure 8:
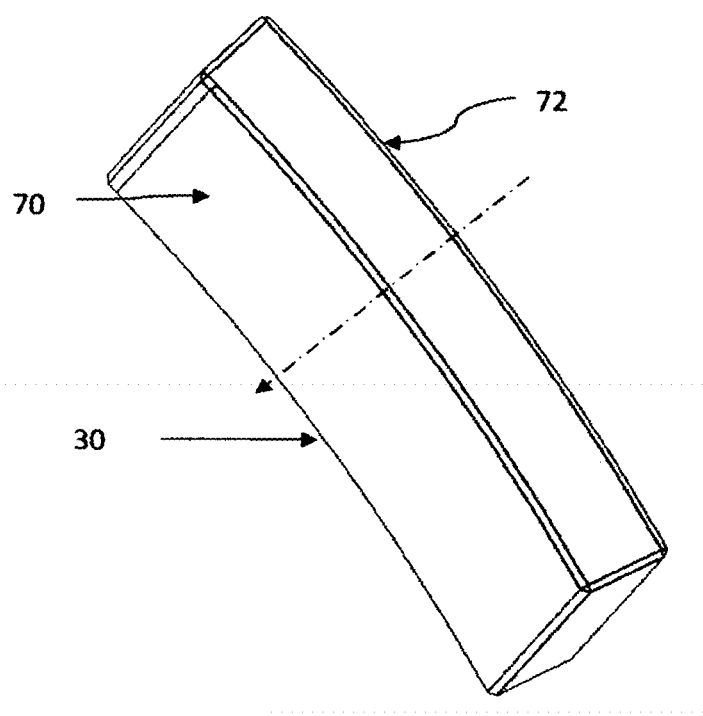
FIG. 8 illustrates a perspective view of a rotor magnet in accordance with a preferred embodiment of the present invention.

FIG. 8 illustrates a perspective view of a rotor magnet 30, in a preferred embodiment of the present invention. The plurality of rotor magnets 30 is also referred as permanent magnets and rotor poles. The examples of rotor magnets 30 includes but not limited to Nickel Iron Boron (NiFeB) magnets, Samarium Cobalt. The plurality of rotor magnets 30 further comprises a first side 70 and second side 72. The plurality of rotor magnets 30 further exhibits magnet polarity. The magnet polarity runs in the radial direction from second side 72 to first side 70, as shown in FIG. 8 by the dotted arrow.

Figure 9:
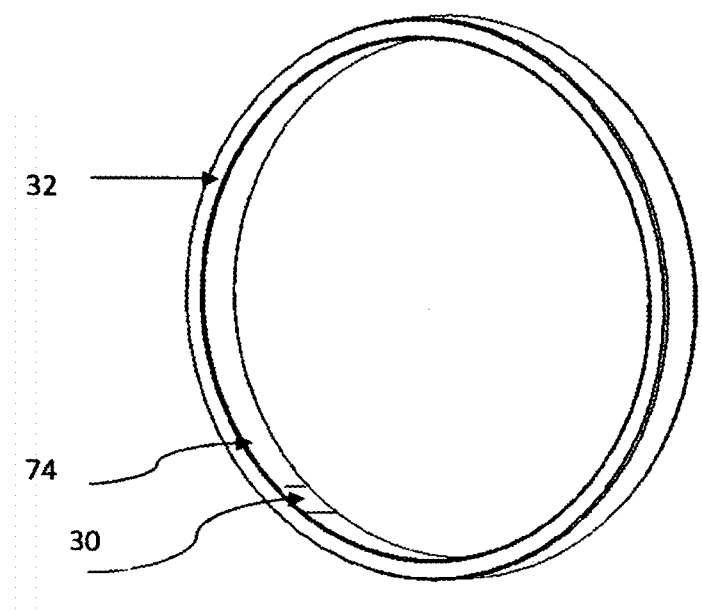
FIG. 9 illustrates a perspective view of a back iron in accordance with a preferred embodiment of the present invention.

FIG. 9 illustrates a perspective view of a back iron, in a preferred embodiment of the present invention. The back iron 32 is configured to provide support for the plurality of rotor magnets 30. The plurality of rotor magnets 30 are placed on the inside perimeter 74 of the back iron 32. The outer diameter of the back iron 32 handles the magnetic field produced by the rotor magnets 30 and the magnetic properties of the back iron 32 are not lost. The shape of the back iron 32 includes but not limited to cylindrical, circular, spherical etc. The height of back iron 32 is sized to match the height of the rotor magnets 30 and the lamination stack of plurality of stator poles 24 (not shown in FIG. 9). The lamination stack of plurality of stator poles 24 is explained in detail in conjunction with FIG. 16 of the present invention.

Figure 10:
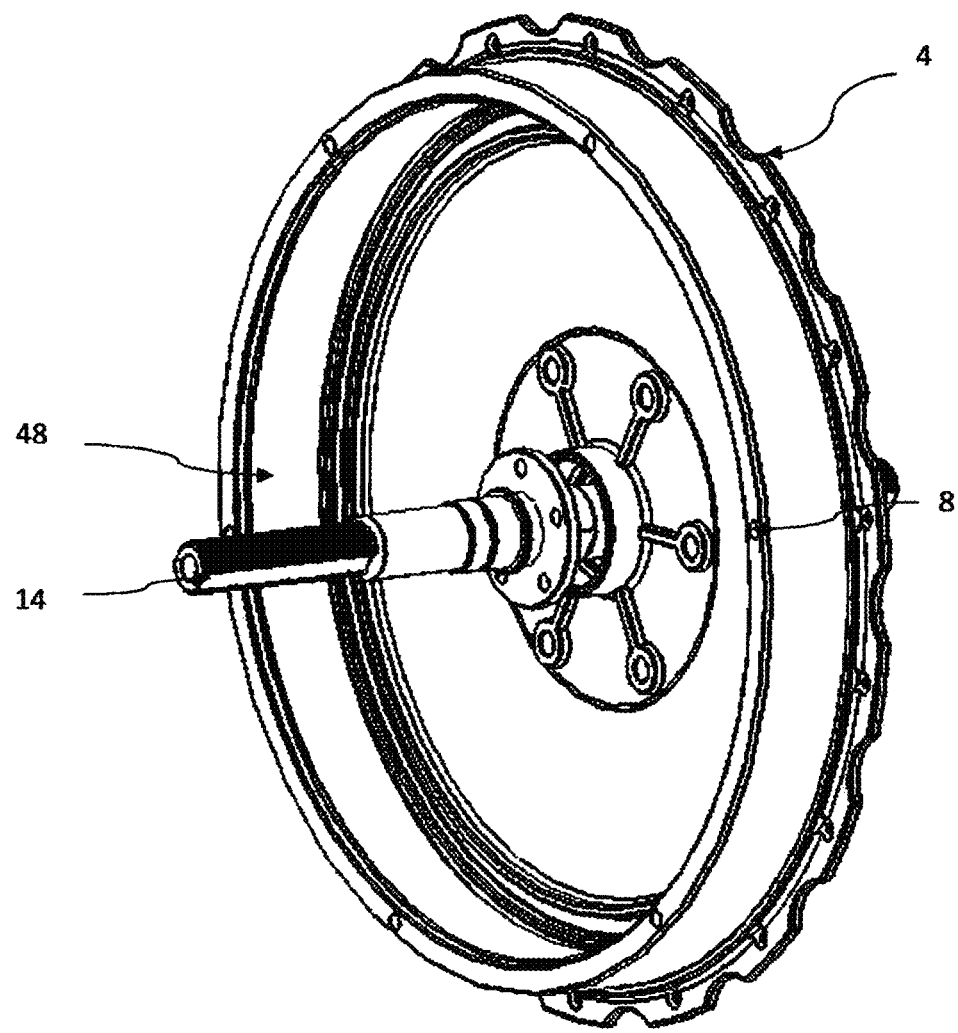
FIG. 10 illustrates a perspective view of the arrangement of covers and connecting pipe in accordance with a preferred embodiment of the present invention.

FIG. 10 illustrates a perspective of the arrangement of one or more covers 4 and connecting pipe 8, in a preferred embodiment of the present invention. In a preferred embodiment of the present invention, the rotor 48 consists of the rotor central aperture 60a surrounded by the connecting pipe 8. The axle 14 (not shown in FIG. 10) passes through the rotor central aperture 60a.

FIG. 11 illustrates a perspective view of the stator 50. The stator 50 includes a stator plate 28, plurality of stator poles 24, an axle 14 and a five phase winding 26. The plurality of stator poles 24 are separated by stator slot 152. The plurality of stator poles 24 is explained in detail in conjunction with FIG. 16, FIGS. 17 and 18 of the present invention. The five phase winding 26 is wound on the plurality of stator poles 24 to carry electric current. The electric current is produced by the power source 82 of the vehicle. In another embodiment of the present invention the electric current may be produced by an external battery. The five phase winding 26 is explained in detail in conjunction with FIG. 19-23 of the present invention. The stator plate 28 is attached to the plurality of stator poles 24. The stator plate 28 is explained in detail in conjunction with FIG. 24 of the present invention. The axle 14 passes through the stator central aperture 60b (not shown in FIG. 11). The axle 14 is explained in detail in conjunction with FIG. 12 of the present invention. In a preferred embodiment of the present invention the electric machine 2 further includes external cable 130 to connect stator 50 to power source 82. In another preferred embodiment of the present invention the electric machine 2 further includes position sensor 122. The position sensor 122 is attached to the stator 50. The position sensor 122 is explained in detail in conjunction with FIG. 25 of the present invention.

Figure 12:
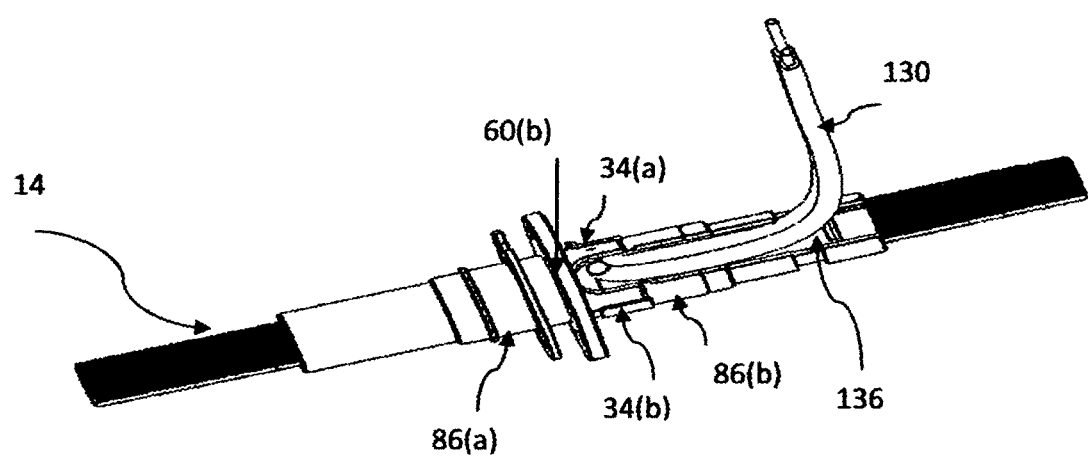
FIG. 12 illustrates a perspective view of axle in accordance with a preferred embodiment of the present invention.

FIG. 12 illustrates a perspective view of axle 14 in a preferred embodiment of the present invention. The axle 14 passes through the stator central aperture 60b. The axle 14 provides support to the electric machine 2. The axle 14 may comprise of any hard material included but not limited to metal, plastic and wood. The shape of axle 14 includes but not limited to a long cylinder. The plurality of torque sensors 34 such as torque sensor 34a and 34b are installed on the axle 14. The torque sensor 34a and 34b are installed at one hundred eighty degrees apart at the opposite side of the axle 14. In an embodiment of the present invention the plurality of torque sensors 34 sense the pedaling torque exerted by a bicycle rider on the axle 14. The locations of plurality of torque sensors 34 are determined to maximize the torque reading. The plurality of torque sensors 34 may comprise of a thin plastic film with copper traces. The thin plastic film with copper traces provides a high electrical resistance preferably in the range of 20 Ohms to 350 Ohms. In another embodiment of the present invention the electric machine 2 further comprises a bearing mounting area 86 such as 86a and 86b. The one or more bearings 18 (not shown in FIG. 12) will be attached to the axle 14 on the bearing mounting area 86. The axle 14 includes cavities 136 for the attachment of the external cable 130.

Figure 13:
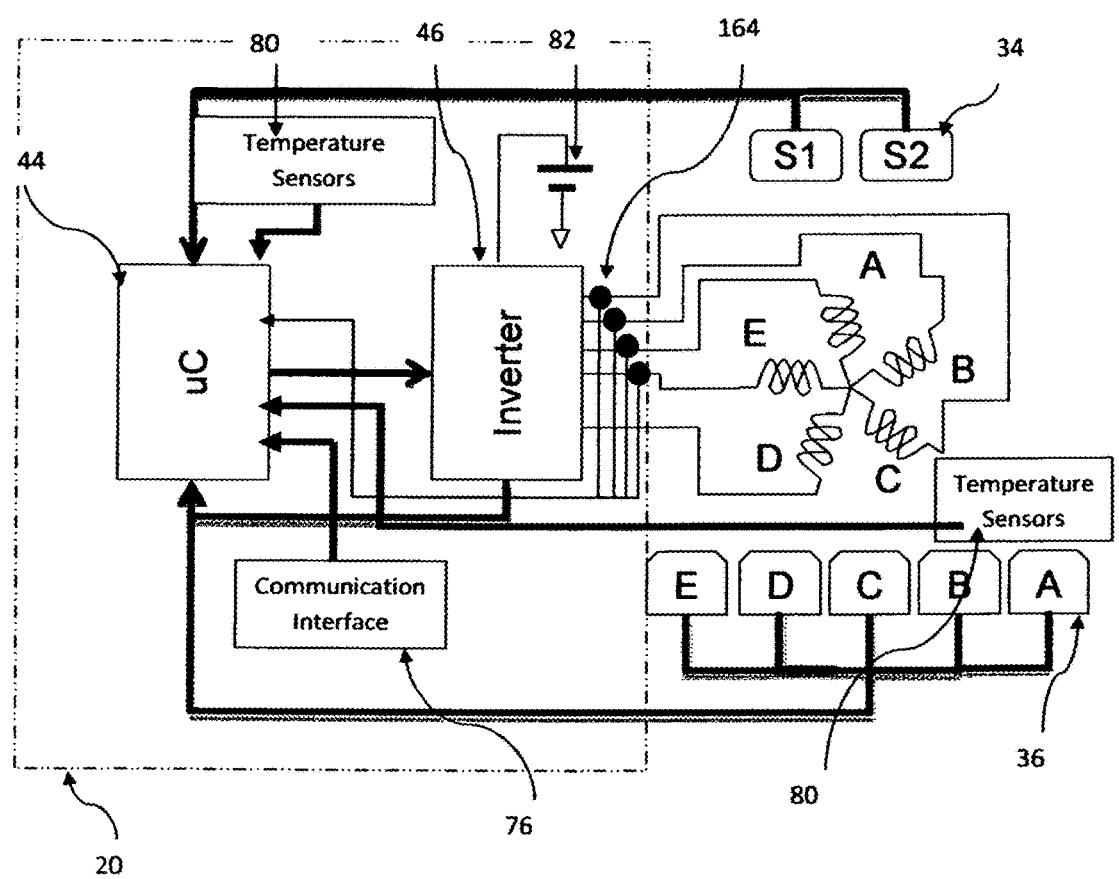
FIG. 13 illustrates a conceptual block diagram of machine controller in accordance with a preferred embodiment of the present invention.

FIG. 13 is a conceptual block diagram of machine controller 20. The machine controller 20 includes a micro controller 44, an inverter 46, a temperature sensor 80 and a micro controller communication interface 76. The micro controller (uC/DSP) 44 generates a signal. The inverter 46 receives the signal and manipulates the signal to control the electric current flow towards the stator 50. The signal may be a pulse width modulated signal. Thus, in particular, the inverter 46 amplifies the pulse width modulated signals to provide appropriate electric current to the stator 50. Also, the inverter 46 may also be referred as power amplifier or power processing module. The micro controller 44 functions as the main processing element of the machine. The micro controller 44 has an ability to send switch mode pulse width modulated signals (PWM) and receive many digital or analog inputs and digital outputs. Examples of the micro controller 44 includes but not limited to Texas instruments' TMS320LF2401A, microchip's micro controller PIC 16F873, ON Semi's MC33033, any other suitable uC/DSP.

In another embodiment of the present invention, inverter 46 includes one or more semiconductor switches 40, such as 40a and 40b (not shown in FIG. 13). The semiconductor switches 40 are explained in detail in conjunction with FIG. 14 of the present invention. The inverter 46 is connected to a power source 82. Example of power source 82 includes but not limited to DC power source (battery), AC power source (applying voltage). Examples of first semiconductor switches 40a include but not limited to MOSFET's, transistors, and thyristors.

The temperature sensor 80 connected to the micro controller 44. The temperature sensor 80 monitors the operating temperature of the electric machine 2. The micro controller communication interface 76 to transmit input commands to the micro controller 44. The torque sensors 34 are connected to the micro controller 44. The torque sensor 34 monitors the torque exerted by the electric machine 2. In another embodiment of the present invention, the electric machine 2 further includes rotor sensors 36. The rotor sensors 36 are connected to the micro controller 44. In a preferred embodiment of the present invention the rotor 48 comprises five rotor sensors 36. Those skilled in the art will envision many other possible variations of rotor sensors 36 within the scope of present invention. In another embodiment of the present invention, the electric machine 2 further includes current feedback sensors 164 connected to the micro controller 44.

Figure 14:
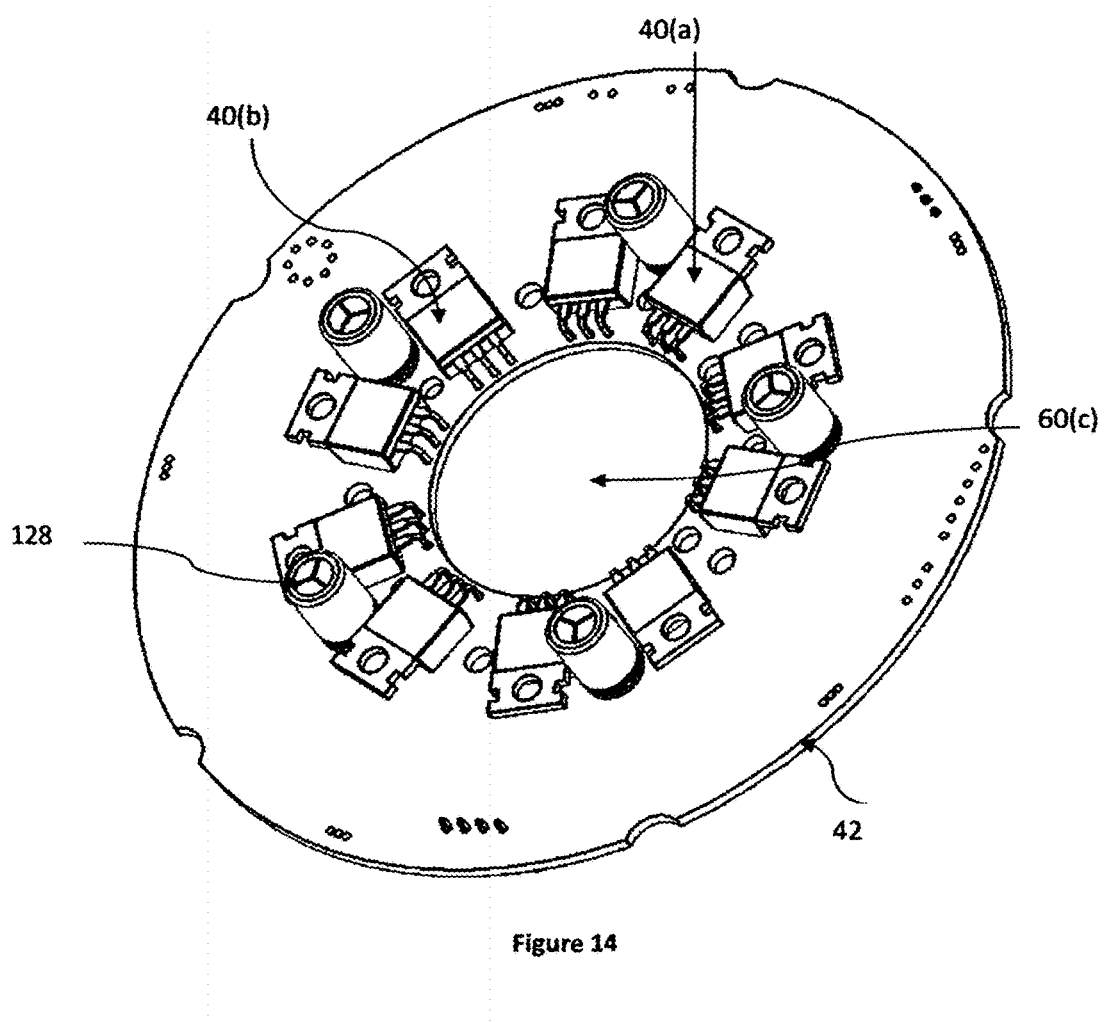
FIG. 14 illustrates a perspective view of the bottom side of machine controller in accordance with a preferred embodiment of the present invention.
Figure 15:
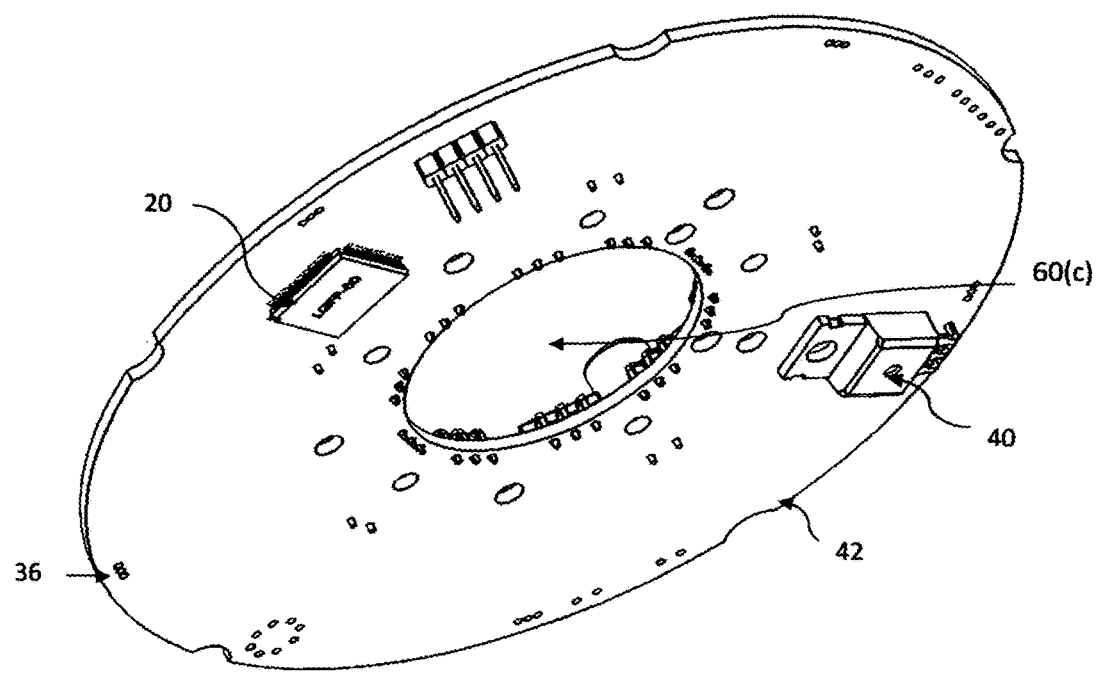
FIG. 15 illustrates a perspective view of the top side of machine controller in accordance with a preferred embodiment of the present invention.

FIG. 14 and FIG. 15 illustrate a perspective view of the bottom side and top side respectively of the machine controller 20. The semiconductor switches 40 connected to five phase windings 26 (not shown in FIG. 14). The semiconductor switches 40 are controlled by micro controller 44. The micro controller 44 is programmed to activate semiconductor switches 40 to control the rotation of the rotor 48 and further the micro controller 44 monitors the flow of current through the five phase windings 26. In a preferred embodiment of the present invention, the electric machine 2 further includes a printed circuit board 42 and one or more capacitors 128. The semiconductor switches 40 should switch at the same rate as the pulse width modulated output of the microcontroller 44. As shown in FIG. 14, the controller central aperture 60c provides a path for the axle 14. The machine controller 20 is attached on a printed circuit board 42 which is placed on a stator plate 28 (not shown in FIG. 14 and FIG. 15). The second semiconductor switches 40b and capacitors 128 are electrically connected to the printed circuit board 42 by the external cables 130 (shown in FIG. 2). As shown in FIG. 15, the printed circuit board 42 is provided with holes for installing rotor position sensors 36. The position sensor 122 is explained in detail in conjunction with FIG. 25 of the present invention. Further, as shown in FIG. 15 the micro controller 44 is attached on the printed circuit board 42. However, in other embodiments of the present invention the one or more of the components of the machine controller 20 may be placed outside the housing of electric machine 2.

Figure 16:
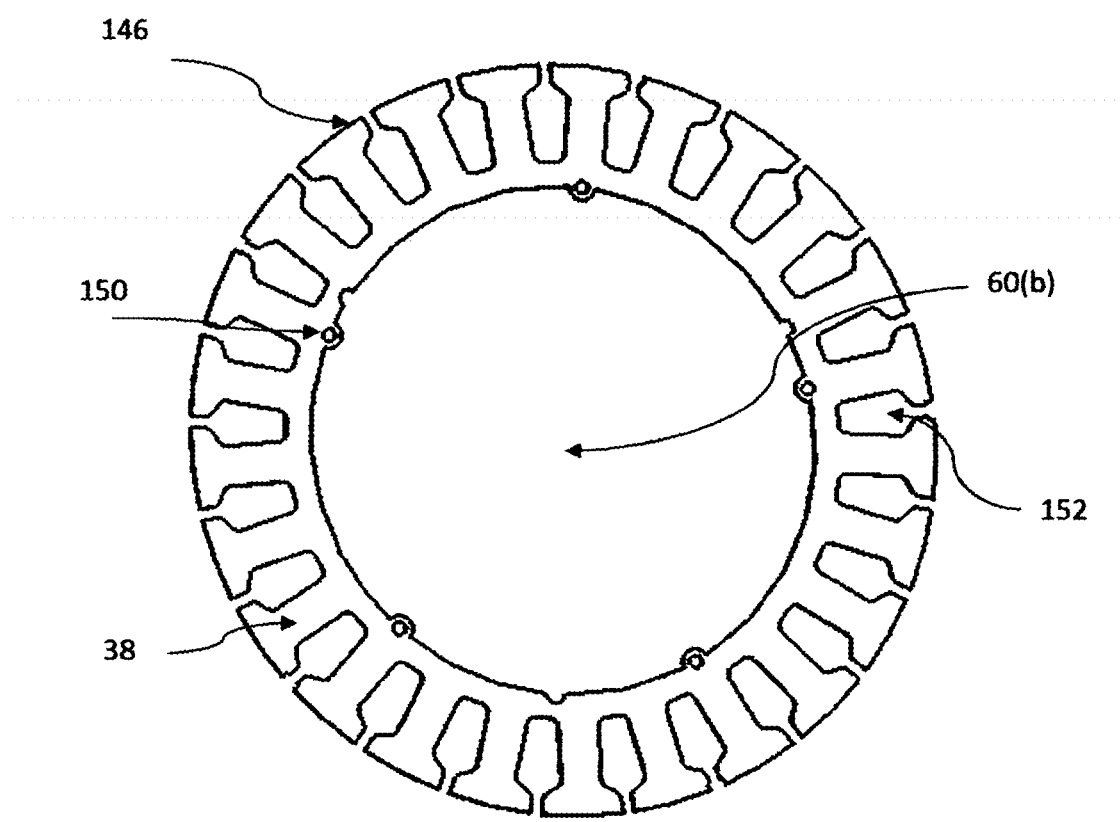
FIG. 16 illustrates a perspective view of the stator laminate in accordance with a preferred embodiment of the present invention.

FIG. 16 illustrates a perspective view of the stator laminate 146 in a preferred embodiment of the present invention. The plurality of stator poles 24 are separated by plurality of stator slots 152 such as 152a, 152b and 152c. The stator central aperture 60b is also shown. The plurality of stator poles 24 may comprise of hard magnetic material including but not limited to steel, iron or magnetic composites. The outer perimeter of the plurality of stator poles 24 indicates pole face 142 (as shown in FIG. 17). In a preferred embodiment of the present invention the electric machine 2 further includes retention elements 150, torque bars 114 (not shown in FIG. 16). The retention elements 150 attach the plurality of stator poles 24 to stator plate 28. The plurality of stator poles 24 provides optimum torque, power and efficiency for the electric machine 2. In a preferred embodiment of the present invention the electric machine 2 further includes single stator pole 38. The single stator pole 38 is explained in detail in conjunction with FIG. 23 of the present invention. The torque bars 114 are explained in detail in conjunction with FIG. 28 of the present invention.

FIG. 17 and FIG. 18 illustrate a perspective view and side view of the plurality of stator poles 24. The plurality of stator laminate 146 is secured to each other to form lamination stack of plurality of stator poles 24. The stator laminate 146 may comprise of electro-magnetic insulation coating to direct magnetic fields to pole face 142. The adjacent poles face 142 is separated by the winding slot 152. The winding slot 152 is explained in detail in conjunction with FIG. 19 of the present invention. In a preferred embodiment of the present invention, as shown in FIG. 18, lamination stack of plurality of rotor magnets 30 is formed by 'N' stator laminates 146. 'N' denotes a positive integer. The lamination stack of plurality of stator poles 24 offers various advantages like power, weight or fabrication cost requirements. Those skilled in the art will envision many other possible variations like by increasing or decreasing the number of stator laminate 146, altering the shape and size of stator laminate 146, pole faces 142 etc within the scope of the present invention.

FIG. 19 illustrates an arrangement of five phase winding 26 in a preferred embodiment of the present invention. In a preferred embodiment of the present invention the stator comprises of twenty-five single stator pole 38. The five phase winding 26 is divided into five phase groups—A, B, C, D and E. The single stator poles 38 are numbered to demonstrate five phase winding 26 as A1 to A5, B1 to B5, C1 to C5, D1 to D5 and E1 to E5. The stator slots 152 are also numbered from one to twenty-five. The five-phase winding 26, may be arranged in a series of k+x wherein k is a positive integer and x belongs to the set {0, 1, 7, 8, 9, 16, 17 and 24}. In a preferred embodiment of the present invention the k+x series is (k+0)-(k+1)-(k+7)-(k+8)-(k+9)-(k+8)-(k+16)-(k+17)-(k+0)-(k+24), further when (k+x) exceeds $n_s$, then (k=k-$n_s$). If k=1, then in accordance with the series the five phase winding 26 for phase A is 1-2-8-9-10-9-17-18-1-25, for phase B is 7-13-14-15-14-22-23-6-5, for phase C is 11-12-18-19-20-19-2-3-11-10, for phase D is 16-17-23-24-25-24-7-8-16-15, for phase E is 21-22-3-4-5-4-12-13-21-20. Those skilled in the art will envision many other possible variations like by increasing or decreasing the value of k within in the scope of the present invention. As shown in FIG. 19, the arrows indicate the clockwise or anti-clockwise direction of five phase winding 26 on the single stator poles 38. In a preferred embodiment of the present invention, the rotor 48 comprises of twenty-two rotor magnet 30. The number (n) of rotor magnet 30 are greater than or equal to 330 divided by the number of stator poles 24, where n is a whole number greater than 0 (n>0), for example 16, 18, 20, 22, 24 etc. The minimization of cogging torque depends on the number of rotor magnet 30. FIG. 19 shows an embodiment of twenty-two rotor magnet 30.

Figure 20:
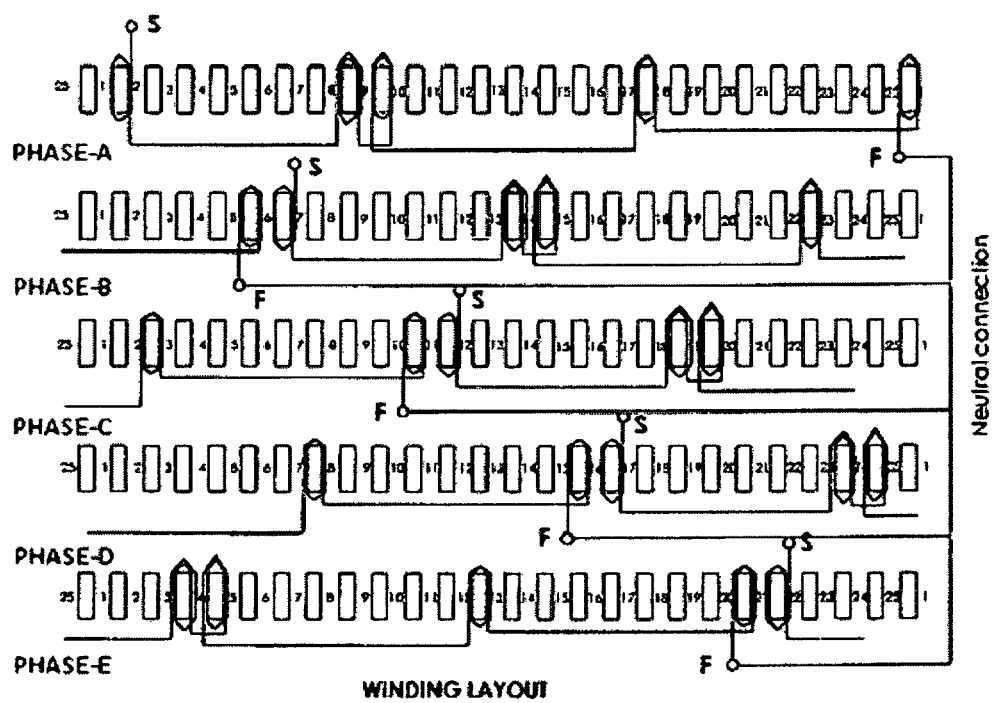
FIG. 20 illustrates an arrangement of five phase winding in a linear layout in accordance with a preferred embodiment of the present invention.
Figure 22:
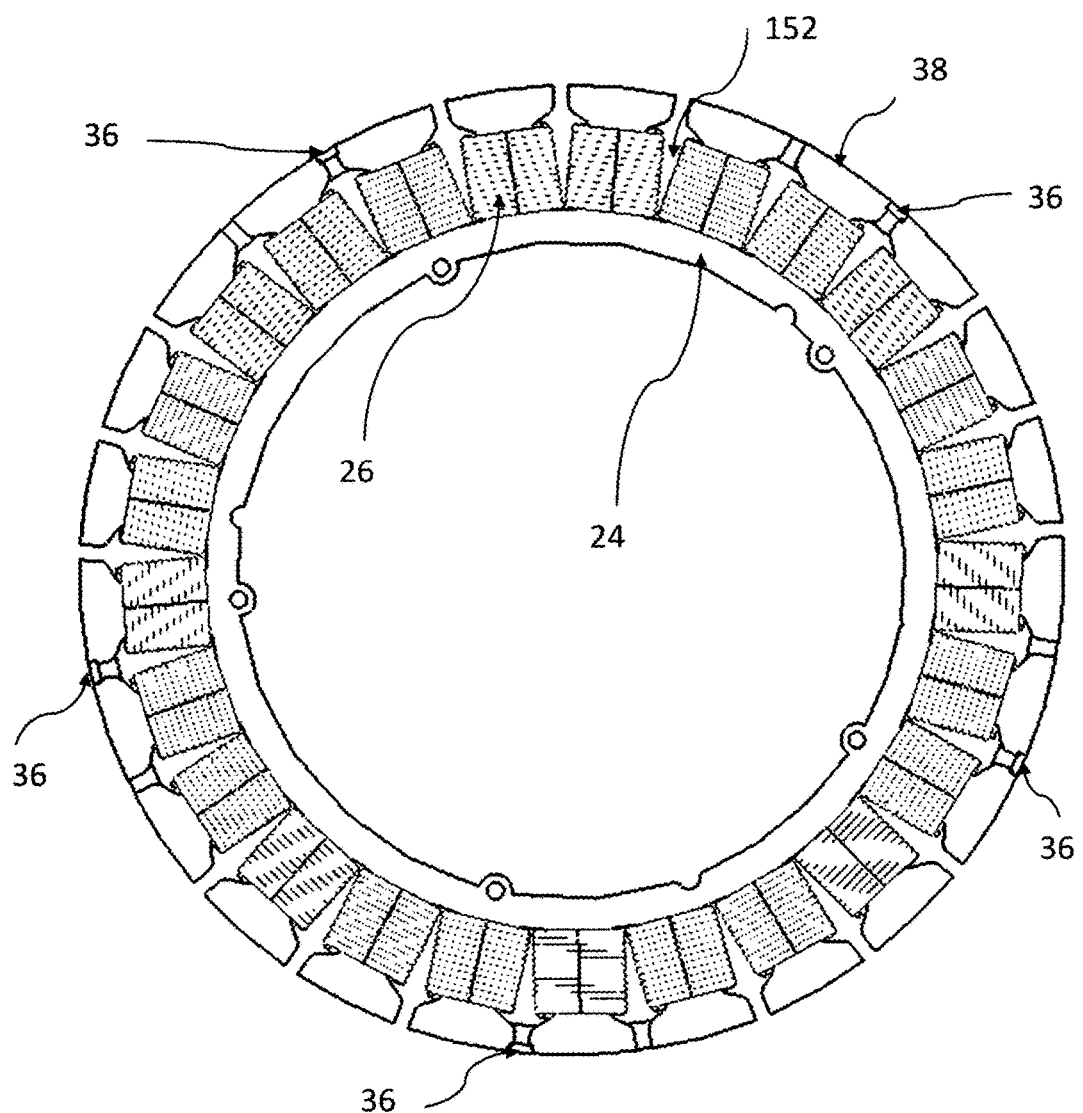
FIG. 22 illustrates a top view of stator pole in accordance with a preferred embodiment of the present invention.
Figure 23:
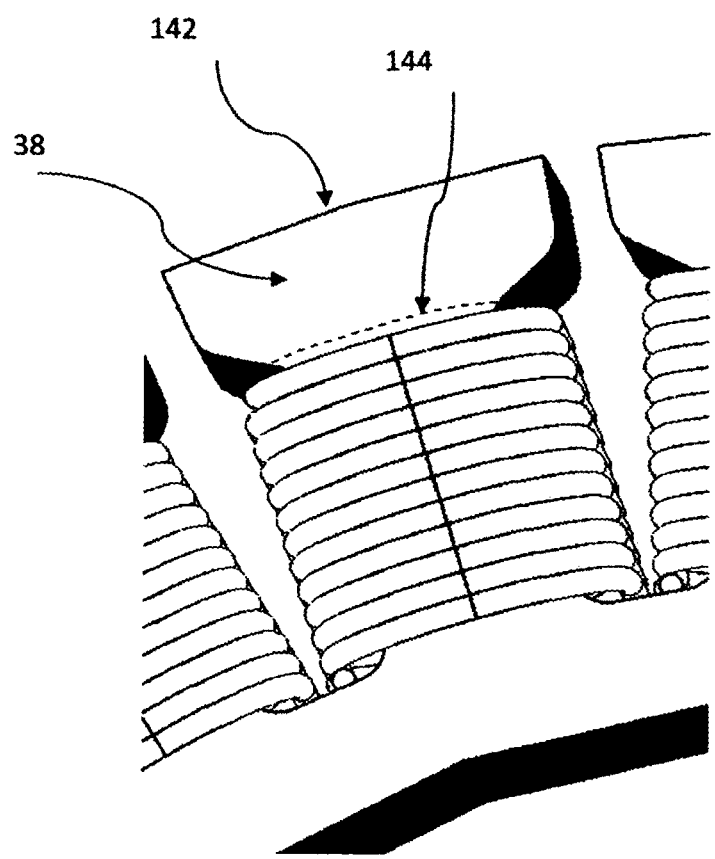
FIG. 23 illustrates a perspective view of a single stator pole with five phase winding in accordance with a preferred embodiment of the present invention.

FIG. 20 and FIG. 21 illustrate an arrangement of five phases winding 26 in a linear layout and tabular form respectively, in accordance with the preferred embodiment of the present invention. FIG. 22 illustrate a top view of stator poles 24 showing the positioning of rotor position sensors 36 with respect to the five phase winding 26. FIG. 23 illustrates a perspective view of a single stator pole 38 with five phase winding 26, in accordance with an embodiment of the present invention. The five phase winding 26 is coated with an insulating material including but not limited to aluminum. The insulating material controls the direction of the electrical current flow in a circular path through the winding around the single stator pole 38. The five phase winding 26 is located below to the outer perimeter of pole face 142. The five phase winding 26 remains below the stator pole dashed line 144. Those skilled in the art will envision many other possible variations in width, height and shape of the single stator pole 38 (as shown in FIG. 17) and five phase windings 26, within the scope of the present invention.

Figure 24:
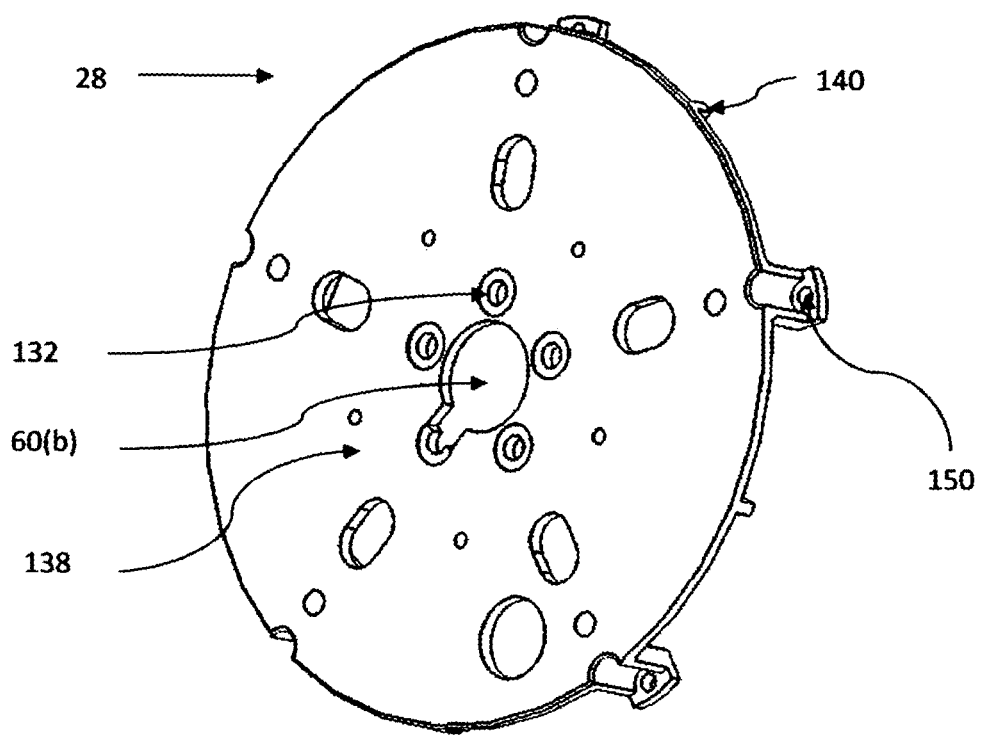
FIG. 24 illustrates a perspective view of stator plate in accordance with a preferred embodiment of the present invention.

FIG. 24 illustrates a perspective view of stator plate 28. The stator plate 28 is designed and configured to provide support for the plurality of stator poles 24 and machine controller 20 (not shown in FIG. 24). In the preferred embodiment of the present invention, the stator plate 28 is in circular shape to match the interface with the plurality of stator poles 24. In another embodiment of the present invention, the shape of stator plate 24 may be oval, cylinder or rectangle. The stator plate 28 may be made up of hard material, a non ferromagnetic material or a material that has good heat transfer properties. The hard material for stator plate 28 includes but not limited to metal, plastic or wood. The stator plate 28 secures the electric machine 2 to the axle 14. The non-ferromagnetic material includes but not limited to aluminum or stainless steel. The retention elements 150 to secure axle 14 and lamination stack of plurality of stator poles 24. The retention elements 150 include but not limited to screws, bolts. The stator plate 28 includes a heat sink surface 138 and a strengthening feature 140. The heat sink surface 138 is located to remove heat from the machine controller 20. The strengthening features 140 to increase the total surface area of the stator plate 28 and maintaining the desired external diameter. The axle 14 (not shown in FIG. 24) is ideally aligned with the central aperture 60.

Figure 25:
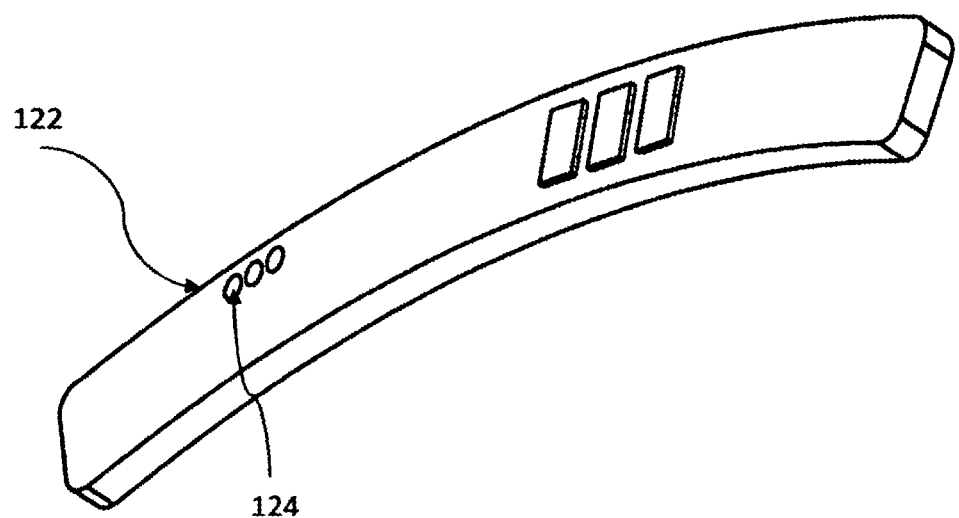
FIG. 25 illustrates a perspective view of rotor position sensor assembly in accordance with a preferred embodiment of the present invention.

FIG. 25 illustrates a perspective view of position sensor assembly 122. The PCB 42 includes plurality of holes 124. The plurality of holes 124 attaches Hall Effect devices (not shown in FIG) to PCB 122. In a preferred embodiment of the present invention, in a brushless AC synchronized permanent magnet motor, the plurality of rotor magnets 30 triggers the Hall Effect devices to provide an efficient means to synchronize the activation of five phase windings 26 by the second semiconductor switches 40b through machine controller 20. In another embodiment of the present invention, the position sensor 122 is an optical sensor that senses a black or white pattern on the rotor 48 and one or more covers 4.

Figure 26:
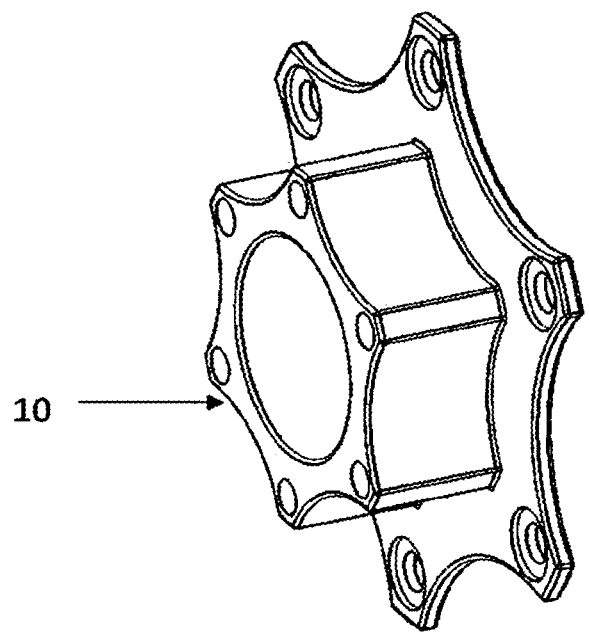
FIG. 26 illustrates a perspective view of brake adaptor in accordance with a preferred embodiment of the present invention.

FIG. 26 is a perspective view of brake adaptor 10. The brake adaptor 10 is attached to a braking mechanism of a vehicle or equipment. The brake adaptor 10 may comprise of any hard material included but not limited to metal, plastic, wood etc. The shape of brake adaptor 10 includes but not limited to a circle, a cylinder, an oval. In a preferred embodiment of the present invention, the brake adaptor 10 may be cast or stamped as a separate piece and secured to the surface of one or more covers 4.

Figure 27:
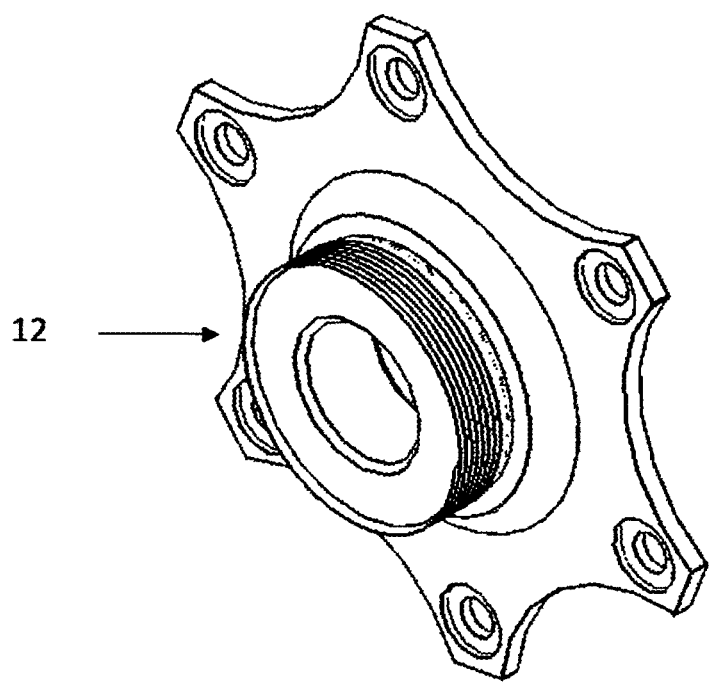
FIG. 27 illustrates a perspective view of gear adaptor in accordance with a preferred embodiment of the present invention.

FIG. 27 is a perspective view of gear adaptor 12. The gear adaptor 12 attached to a gear mechanism of a vehicle or equipment. The gear adaptor 12 may comprise of any hard material included but not limited to metal, plastic, wood etc. The shape of gear adaptor 12 includes but not limited to a circle, a cylinder, an oval. In a preferred embodiment of the present invention, the gear adaptor 12 may be cast or stamped as a separate piece and secured to the surface of one or more covers 4 (not shown in FIG. 27).

Figure 28:
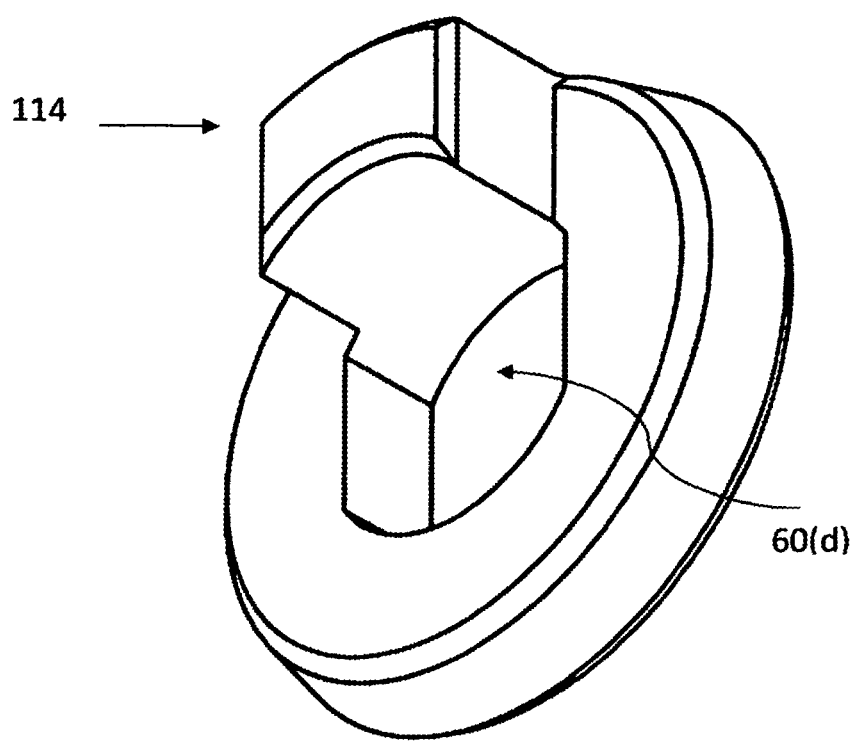
FIG. 28 illustrates a perspective view of torque bar in accordance with a preferred embodiment of the present invention.

FIG. 28 is a perspective view of torque bar 114. The torque bar 114 secures the electric machine 2 to a vehicle. The torque bar 114 comprises central aperture 60d to allow the axle 14 (not shown in FIG. 28) to pass through it. The retention element 150 secures the axle 14 to vehicle and to the torque bar 114. Further, the torque bar 114 prevents electric machine 2 from rotating during vehicle operation.

FIG. 29 illustrates a perspective view of a bicycle 54. The bicycle 54 includes a seat 100, handlebars 102, tires 52, spokes 112, throttle 106, display 108, a pedal 108, chain 110 and power supply 82. The throttle 106 and display 108 control the electric machine 2 and the power supply 82. In another embodiment of the present invention the bicycle 54 includes an internal combustion engine (not shown in figure). The electric machine 2 can supplement a manual power system through the pedal 108, chain 110 and an internal combustion engine. The electric machine 2 is attached to the bicycle 54 through attachment means. The attachment means includes but not limited to freewheels, spokes gears, bearings.

FIG. 30 illustrates a perspective view of an electric scooter 56. In an embodiment of the present invention the electric scooter 56 includes an internal combustion engine. The electric scooter 56 includes suspension arm 92. The suspension arm 92 secures the electric machine 2 to the tire 52 and power supply 82.

Figure 31:
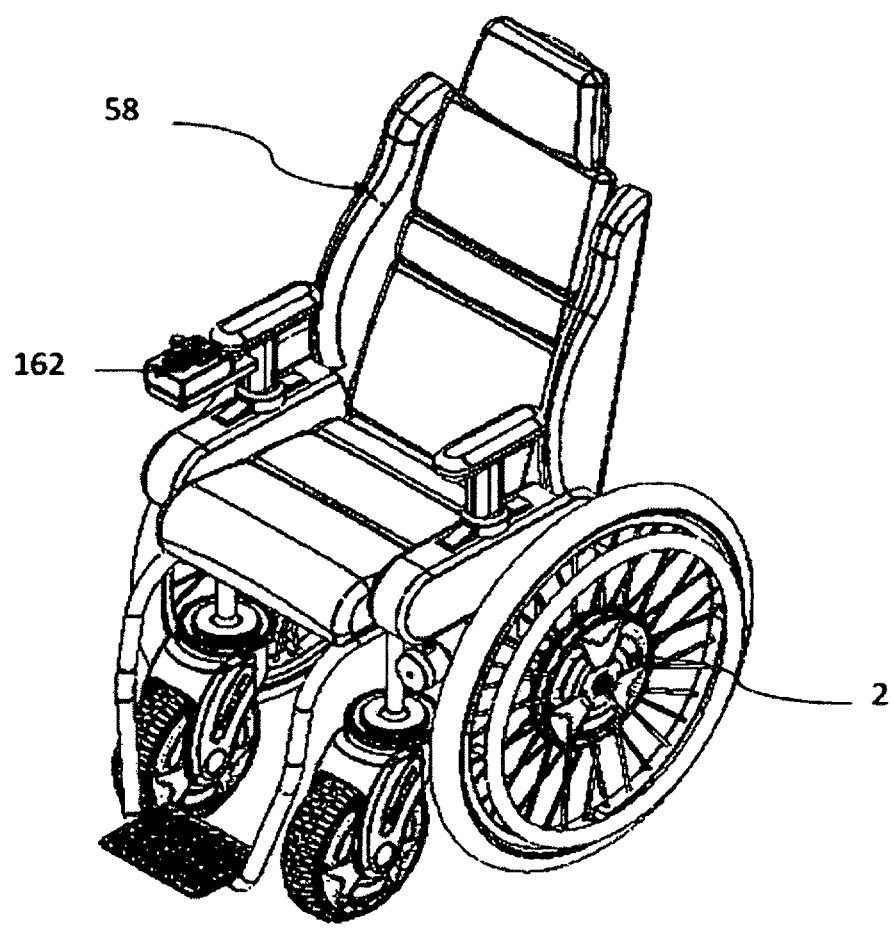
FIG. 31 illustrates a perspective view of an electric wheelchair in accordance with a preferred embodiment of the present invention.

FIG. 31 illustrates a perspective view of an electric wheelchair 58. The electric wheelchair 58 includes a joystick module 162. The joystick module 162 controls the electric machine 2 and power supply 82 (not shown in FIG. 31). The present invention provides various advantages. This invention advantageously provides an electric machine capable of producing high torque at low power source. The electric machine provides an improved light weight structural configuration, portable design and highly efficient manufacturing and assembly methods. The unique winding arrangement of the electric machine allows a vehicle with improve hill climbing ability and low cogging.

In this detailed description of the invention there are shown and described only exemplary embodiments of the invention and some examples of its advantages. It is to be understood that the invention is capable of use in various other combinations and environments and is capable of changes or modifications within the scope of the invention as described herein.

The invention claimed is:

1. A multi-phase multi-pole electric machine attached to a wheel of a vehicle, the wheel having spokes, said multi-phase multi-pole machine comprising:

a stator core comprising an axle, said stator core comprising:
a stator lamination, said stator lamination comprising:
a first, a second, a third, a fourth and a fifth retention elements are located around an inner circumference of the stator lamination;
a first, a second, a third, a fourth and a fifth protrusion elements covering the first, the second, the third, the fourth and the fifth retention elements;
a first groove is located between the first retention element and the second retention element, said first grove located immediately adiacent to the second retention element in a clockwise direction than the first retention element;
a second groove is located between the third retention element and the fourth retention element, said second grove located approximately in the middle between the third retention element and the fourth retention element;
a third groove is located between the fifth retention element and the first retention element, said third groove located immediately adiacent to the fifth retention element in a counter clock-wise direction than the first retention element;
a rotor attached to said stator core, said rotor comprising:
two identical covers, wherein each cover having plurality of spoke holes directly attached to the spokes of the wheel of said vehicle for rotating around said axle:
a connecting pipe disposed between said one or more two identical covers rotated around the stator core:
a back-iron directly attached to the inner perimeter of said connecting pipe;
a plurality of rotor magnets attached to inner perimeter of said back-iron, and further separated from said stator core by an air gap; and
wherein the two identical covers rotate along with the spoke holes with the rotation of the rotor at the same speed.

2. The multi-phase multi-pole electric machine according to claim 1, further comprises a machine controller located inside the electric machine and connected to said stator core to control the flow of current.

3. The multi-phase multi-pole electric machine in claim 2, wherein said machine controller further comprises:
a micro controller to generate a signal;
an inverter receives said signal from said microcontroller, said inverter manipulates said signal to control electrical current flow to said stator core;
a temperature sensor to measure the temperature of said machine controller and said five phase winding;
a communication interface to transmit input commands to said micro controller;
a torque sensor to measure torque exerted by an operator of the vehicle and manipulate the controller output based on the measured torque; and
multiple current sensors to monitor battery current and various winding currents and to manipulate the controller output based on these currents.

4. The multi-phase multi-pole electric machine according to claim 1 further comprises a torque sensor attached to a stationary axle, said torque sensor to sense the torque exerted and transmit the information to said machine controller.

5. The multi-phase multi-pole electric machine according to claim 1 further comprises a removable disc adaptor attached to a brake mechanism of said vehicle, wherein said vehicle has pedals.

6. The multi-phase multi-pole electric machine according to claim 1 further comprises a removable external gear adaptor, said gear adaptor is attached to gear mechanism.

7. The multi-phase multi-pole electric machine in claim 1 further comprises one or more rotor position sensors to sense the position of said rotor and configured for a 5-phase motor.

8. The multi-phase multi-pole electric machine in claim 1 further comprises ten or a multiple of ten semi conductor switches connected to said machine controller and said five phase windings.

9. A multi-phase multi-pole electric machine attached to a vehicle with pedals and a wheel with spokes said multi-phase multi-pole machine comprising:
- a stator core comprising an axle;
- a rotor attached to said stator core, said rotor comprising:
- two identical covers, wherein each cover having plurality of spoke holes directly attached to the spokes of the wheel of said vehicle for rotating around said axle:
- a connecting pipe disposed between said two identical covers rotated around the stator core: and
- a back-iron directly attached to the inner perimeter of said connecting pipe;
- a plurality of rotor magnets attached to inner perimeter of said back-iron, and further separated from said stator core by an air gap: connecting pipe; and
- wherein the two identical covers rotate along with the spoke holes with the rotation of the rotor at the same speed;
- wherein stator core attached to the said rotor, said stator core comprising:
- a stator lamination, said stator lamination comprising:
- a first, a second, a third, a fourth and a fifth retention elements are located around an inner circumference of the stator lamination;
- a first, a second, a third, a fourth and a fifth protrusion elements covering the first, the second, the third, the fourth and the fifth retention elements;
- a first groove is located between the first retention element and the second retention element, said first grove located immediately adiacent to the second retention element in a clockwise direction than the first retention element;
- a second groove is located between the third retention element and the fourth retention element, said second grove located approximately in the middle between the third retention element and the fourth retention element;
- a third groove is located between the fifth retention element and the first retention element, said third groove located immediately adjacent to the fifth retention element in a counter clock-wise direction than the first retention element;
- plurality of stator poles separated by stator slots;
- five phase winding wound around said stator poles;
- stator plates attached to said plurality of stator poles; and
- wherein said axle passes through the central aperture of said stator plates;
- a machine controller connected to said stator core to control the flow of current; and
- a torque sensor attached to said axle, said torque sensor to sense the torque exerted and transmits the information to said machine controller.

10. The multi-phase multi-pole electric machine in claim 9 wherein said machine controller further comprises:
- a micro controller to generate a signal;
- an inverter receives said signal from said microcontroller, said inverter manipulates said signal to control electrical current flow to said stator core;
- a temperature sensor to measure the temperature of said machine controller and said five phase winding; and
- a communication interface to transmit input commands to said micro controller.

11. The multi-phase multi-pole electric machine according to claim 9 further comprises one or more semi conductor switches connected to said machine controller and said five phase windings.

* * * * *